United States Patent
Breau et al.

(10) Patent No.: US 9,043,473 B1
(45) Date of Patent: May 26, 2015

(54) METHODS AND SYSTEMS FOR AUTHENTICATING A DEVICE WITH MULTIPLE NETWORK ACCESS IDENTIFIERS

(75) Inventors: Jeremy R. Breau, Kansas City, MO (US); John E. Belser, Olathe, KS (US); George A. Georgiou, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1098 days.

(21) Appl. No.: 12/491,888

(22) Filed: Jun. 25, 2009

(51) Int. Cl.
*G06F 15/16* (2006.01)
*H04L 9/32* (2006.01)

(52) U.S. Cl.
CPC .................................. *H04L 9/3281* (2013.01)

(58) Field of Classification Search
USPC ......................................................... 709/227
See application file for complete search history.

(56) References Cited

U.S. PATENT DOCUMENTS

| | | | |
|---|---|---|---|
| 5,852,812 A | 12/1998 | Reeder | |
| 6,189,042 B1 | 2/2001 | Keller-Tuberg | |
| 6,421,714 B1 | 7/2002 | Rai et al. | |
| 6,785,256 B2 | 8/2004 | O'Neill | |
| 6,816,912 B1 | 11/2004 | Borella et al. | |
| 6,829,473 B2 | 12/2004 | Raman et al. | |
| 6,956,846 B2 | 10/2005 | Lewis et al. | |
| 6,965,914 B2 | 11/2005 | Dowling | |
| 6,993,039 B2 | 1/2006 | Borella | |
| 7,031,275 B1 | 4/2006 | Borella et al. | |
| 7,080,151 B1 | 7/2006 | Borella et al. | |
| 7,130,625 B2 | 10/2006 | Akgun et al. | |
| 7,154,868 B1 | 12/2006 | Sharma et al. | |
| 7,272,128 B2 | 9/2007 | Harris et al. | |
| 7,280,546 B1 | 10/2007 | Sharma et al. | |
| 7,346,684 B2 | 3/2008 | Borella | |
| 7,366,509 B2 | 4/2008 | Akgun et al. | |
| 7,454,206 B1 | 11/2008 | Phillips et al. | |
| 2002/0191572 A1 | 12/2002 | Weinstein et al. | |
| 2003/0046396 A1 | 3/2003 | Richter et al. | |
| 2003/0236745 A1 | 12/2003 | Hartsell et al. | |
| 2004/0103171 A1 | 5/2004 | Mullis, II et al. | |
| 2006/0002356 A1* | 1/2006 | Barany et al. | 370/338 |
| 2006/0077924 A1 | 4/2006 | Rune | |
| 2007/0191014 A1* | 8/2007 | Zheng et al. | 455/438 |
| 2008/0291867 A1 | 11/2008 | Weniger et al. | |
| 2008/0304441 A1 | 12/2008 | Tsirtsis et al. | |

* cited by examiner

*Primary Examiner* — Hee Soo Kim

(57) ABSTRACT

Methods, systems, and devices are presented that allow a wireless communication device (WCD) to use multiple access identifiers (NAIs) in conjunction with a communication session between the WCD and a home agent. The home agent may maintain a binding that reflects the state of the session. Accordingly, the binding may contain a home IP address (HOA) as well as a first NAI. The home agent may then receive a registration request message containing the HOA and a second NAI. In order to avoid potential hijacking attacks from entities other than the WCD, the home agent may, in conjunction with an authentication server, attempt to validate that that first NAI and second NAI are both associated with the WCD. If this is the case, the home agent may update the binding to reflect that the second NAI is associated with the session, and the home agent may maintain the session so that the WCD does not suffer an appreciable interruption in service.

20 Claims, 11 Drawing Sheets

FIG. 2A

HOME AGENT BINDING
DATABASE 200

| HOME ADDRESS (HOA) | CARE OF ADDRESS (COA) | NETWORK ACCESS IDENTIFIER (NAI) |
|---|---|---|
| 10.0.0.1 | 192.168.1.2 | ALICE@OPERATOR1.COM |
| 10.0.0.2 | 192.168.1.2 | BOB@OPERATOR1.COM |
| 10.0.0.3 | 153.128.3.72 | CHRIS@OPERATOR2.COM |
| 10.0.0.5 | 63.157.216.253 | DAVID@OPERATOR3.COM |

AUTHENTICATION SERVER PROFILE DATABASE
225

| NETWORK ACCESS IDENTIFIER 1 | NETWORK ACCESS IDENTIFIER 2 | NETWORK ACCESS IDENTIFIER 3 |
|---|---|---|
| ALICE@OPERATOR1.COM | ALICE@WIFI.NET | AJW688@ISP.COM |
| BOB@OPERATOR1.COM | | |
| CHRIS@OPERATOR2.COM | | |
| DAVID@OPERATOR3.COM | DSMITH@GMAIL.COM | |

230 — (row 1)
232 — (row 2)
234 — (row 3)
236 — (row 4)

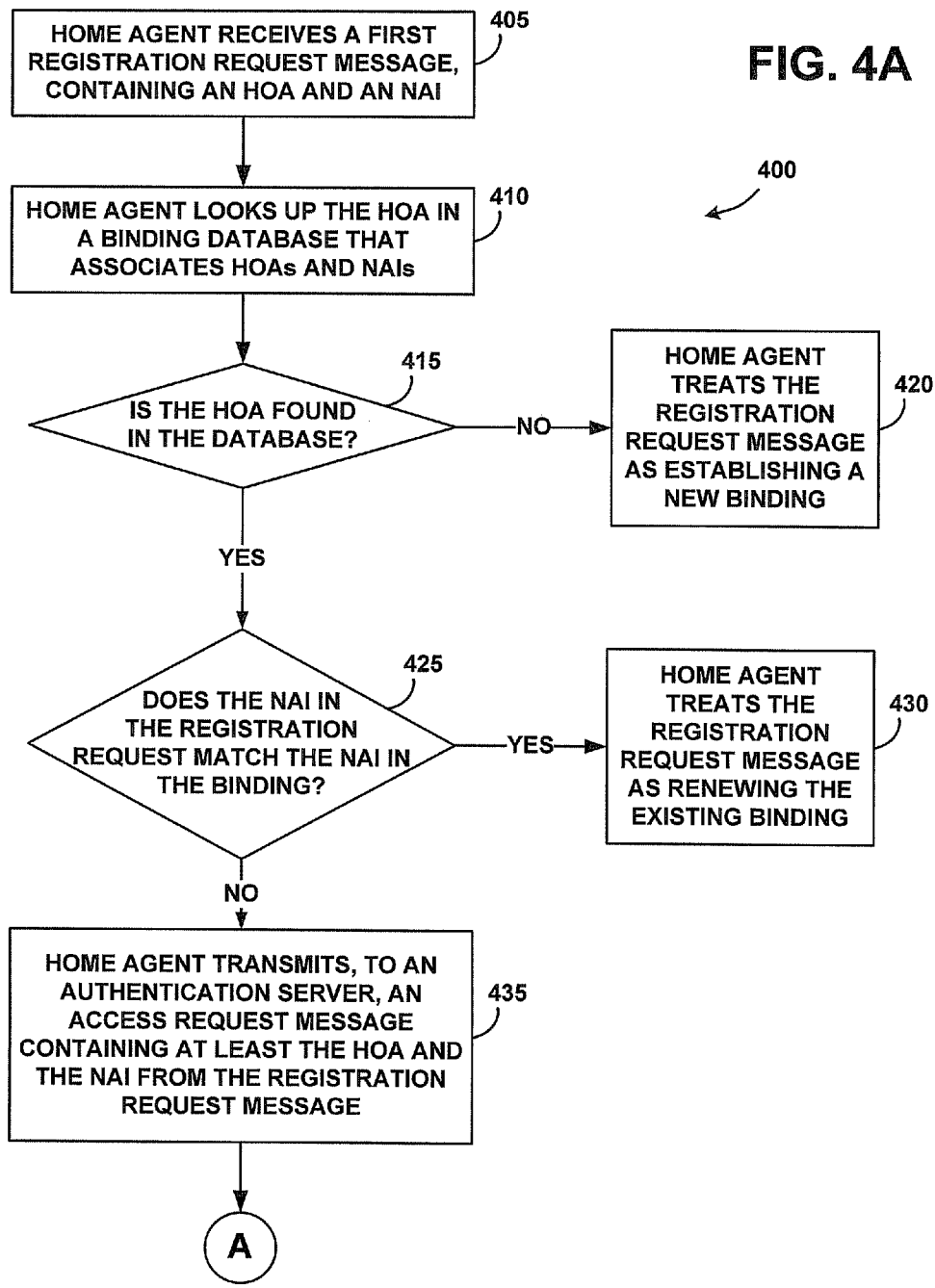

METHODS AND SYSTEMS FOR AUTHENTICATING A DEVICE WITH MULTIPLE NETWORK ACCESS IDENTIFIERS

BACKGROUND

As wireless communication systems continue to grow in popularity, they also continue to grow in diversity. While at the present time various types of third-generation (3G) wireless networks are commercially deployed throughout many parts of the world, fourth-generation (4G) wireless networks are also beginning to be deployed. These systems include, but are not limited to, Code Division Multiple Access (CDMA®), Worldwide Interoperability for Microwave Access (WIMAX®), Universal Mobile Telecommunications System (UMTS), Long Term Evolution (LTE®), or other protocols. Each type of 3G and 4G wireless network may employ different types of physical layer modulation and link-layer signaling, and may operate using different carrier frequencies. For example, a first base transceiver station (BTS) from a 3G wireless network may radiate on a first carrier frequency to define a first wireless coverage area. Additionally, a second BTS from a 4G wireless network may radiate on a second carrier frequency to define a second wireless coverage area. The first and second carrier frequencies can be chosen with an appropriately large guard band so that communications using the first carrier frequency do not interfere with communications using the second carrier frequency.

As these 3G and 4G systems continue to be deployed, it is unlikely that there will be one ubiquitous, standard wireless network technology. Instead, wireless communication devices (WCDs) such as cell phones, may support multiple 3G and/or 4G technologies in order for users of these devices to maximize their wireless coverage. Thus, it is desirable for these WCDs to be able to support vertical handoffs from a first type of wireless network (e.g., a 3G wireless network) to a second type of wireless network (e.g., a 4G wireless network), and/or vice versa. In this way, a WCD can maintain wireless network coverage even if either the first or second type of wireless network is not within range of the WCD.

Ideally, the WCD can perform vertical handoffs without interrupting any of its ongoing communication sessions. However, this may be a challenge when the WCD is configured to use different forms of identification to access the different types of networks.

OVERVIEW

Disclosed herein are methods and systems for authenticating a device that uses multiple network access identifiers (NAIs). An NAI may be, for example, a string of characters that serves to authenticate a given WCD on a given network. A WCD may be arranged to use a different NAI on each wireless network that the WCD uses for communication. Thus, for purposes of performance, efficiency, security, billing, and potentially for other reasons as well, it is advantageous for one or more network entities to correlate the different NAIs used by a WCD so that the WCD can be smoothly handed off between these different wireless networks.

Accordingly, in an example embodiment, a given WCD is assigned a first NAI to use with a first wireless network, and the given WCD is also assigned a second NAI to use with a second wireless network. The WCD may also be assigned a home network that may be different from both the first wireless network and the second wireless network. For instance, the given WCD's home network may be associated with a network service provider or a private organization. While the given WCD is using either the first or the second wireless network, the given WCD may use mobile IP to access its home network. In doing so, the given WCD may access a mobile IP home agent in the given WCD's home network. Preferably, the home agent anchors the WCD's mobile IP session and may assign a home IP address (HOA) to the WCD. The home agent may also communicate with an authentication server, such as an authentication, authorization, and accounting (AAA) server, to correlate the first NAI with the second NAI.

While the WCD is using the first wireless network, the home agent may store a representation of the WCD's assigned HOA and the first NAI in a tuple. Preferably, this representation is referred to as a binding. A home agent may store such a binding in a database of bindings, and the database may be indexed by the HOA field.

If the WCD is handed off to the second wireless network, the WCD may attempt to register with the home agent using the second NAI. Accordingly, the home agent may receive, from the WCD, a mobile IP registration request message containing the HOA and the second NAI.

It may be advantageous for the WCD to maintain the same HOA, even as the WCD uses a new NAI. For instance, if the WCD is in the process of communicating with a correspondent node (e.g., a web server, a gaming server, a voice over Internet Protocol (VoIP) server, or some other type of network resource), the WCD may be engaged in a Transport Control Protocol (TCP) or User Datagram Protocol (UDP) communication session with the correspondent node. Such a session may be tied to the HOA of the WCD. Thus, if the WCD is forced to change its HOA when it begins to use a new NAI, the WCD's TCP and/or UDP session(s) may be abruptly terminated. In such an event, a user of the WCD might be subjected to a noticeable delay or a service disruption.

Accordingly, the home agent may attempt to maintain the WCD's assigned HOA by verifying that the first NAI and the second NAI are both associated with the WCD. As part of this process, the home agent may determine that the first NAI and the second NAI are different, and responsive to this determination, transmit an access request message containing the first NAI and the second NAI to the authentication server.

The home agent may then receive, from the authentication server, an access accept message verifying that the first NAI and the second NAI are both associated with the WCD. In response to receiving the access accept message, the home agent may update the binding to associate the HOA with the second NAI, and transmit a registration reply message to the WCD, thereby informing the WCD that its session with the home agent has been updated and maintained with the same HOA.

In this way, vertical handoffs between different wireless networks can be supported, even if a WCD uses a different NAI for each network. Further, these vertical handoffs can be supported in a smooth fashion by maintaining the same HOA assignment for the WCD. Thus, as the WCD roams between various wireless networks, the WCD may be able to maintain its communication sessions with correspondent nodes as the WCD is handed off from wireless network to wireless network.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 2A is a home agent binding database in accordance with an exemplary embodiment;

FIG. 2B is an authentication server profile database in accordance with an exemplary embodiment;

FIGS. 4A, 4B, 5A, 5B, 5C, and 5D are flow charts of methods in accordance with exemplary embodiments.

DESCRIPTION

Disclosed herein are methods, systems, and apparatuses for authenticating a device that uses multiple NAIs. In particular, the device may be a WCD, and each of the multiple NAIs may be used by the WCD to access a different wireless network. Via these wireless networks, the WCD may access a mobile IP home agent. The home agent, possibly in conjunction with an authentication server, may correlate the multiple NAIs to determine that each NAI is associated with the WCD. In doing so, the home agent can maintain a persistent HOA assignment for the WCD, even as the WCD is handed off from one wireless network to another.

I. Network Architecture

Figure 1:
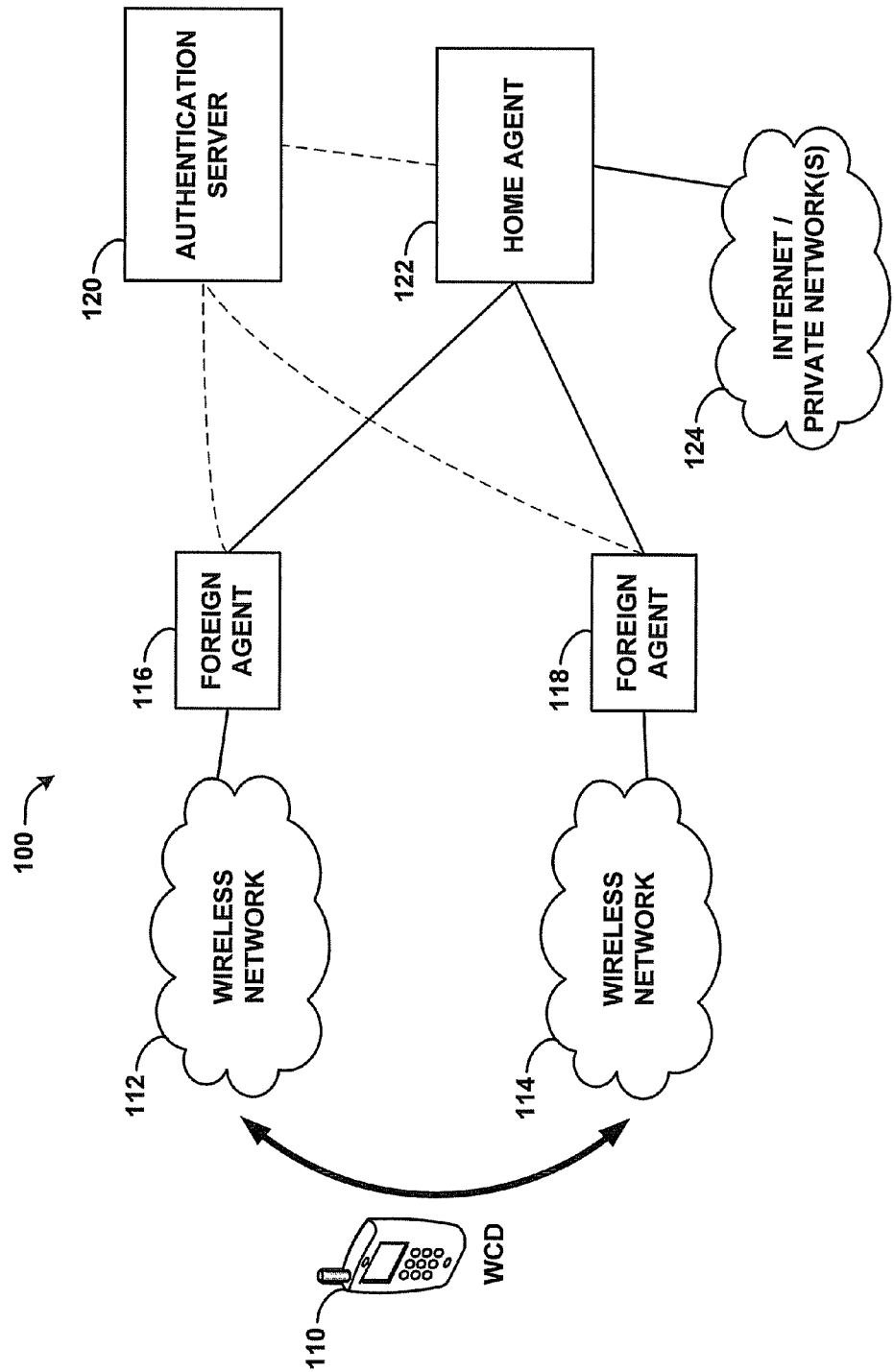
FIG. 1 is a block diagram of a communication network in accordance with an exemplary embodiment.

FIG. 1 is a simplified block diagram of an exemplary communication network 100, in which exemplary embodiments may be employed. WCD 110 may use both wireless network 112 and wireless network 114 to access other networks, such as the Internet and/or private networks. WCD 110 may be configured to use a first NAI to access wireless network 112, and to use a second NAI to access wireless network 114.

An NAI may be a string of characters or a string of bytes that represents a WCD or a WCD's user to a network. For instance, an NAI may resemble an email address, taking the form of "user@operator". Of course, an NAI may take other forms as well. Regardless of the exact form of the NAI, the NAI preferably allows a network, such as wireless network 112 and/or wireless network 114, to verify that an entity associated with the NAI is permitted to access the network.

For instance, when WCD 110 attempts to access wireless network 112, WCD 110 may transmit the first NAI, as well as optional additional information, to wireless network 112. The additional information may include other types of identifiers associated with WCD 110 or a user of WCD 110, such as a hardware identifier or a user identifier. The additional information may contain other data as well. Based on the first NAI, and possibly some of the additional information, wireless network 112 may determine whether to permit WCD 110 to use wireless network 112. If WCD 110 is permitted to use wireless network 112, wireless network 112 may apply one or more policies to WCD 110, such as a maximum data rate and/or access to certain applications. Once permitted to use wireless network 112, WCD 110 may access other networks, such as the Internet/private network(s) 124, via wireless network 112. In doing so, communication between WCD 110 and these networks may traverse foreign agent 116 and/or home agent 122.

A foreign agent 116, 118 may be a router-like device that manages the connectivity of WCDs to a packet-switched network. Examples of foreign agents include CDMA packet data serving nodes (PDSNs) and WIMAX access serving network gateways (ASN-GWs). In an example embodiment, foreign agent 116 serves tens, hundreds or thousands of WCDs via point to point protocol (PPP) links to each WCD. However, a PPP link to a WCD is not required for foreign agent 116 to serve a WCD. Foreign agent 116 may also authenticate WCDs on behalf of wireless network 112, or, in conjunction with authentication server 120, facilitate such authentication of WCDs. Once a WCD is authenticated, foreign agent 116 may grant the WCD access to Internet/private IP network(s) 124. Foreign agent 118 may perform similar functions in conjunction with wireless network 114.

Foreign agents 116, 118 may connect directly to Internet/private network(s) 124. Alternatively, these foreign agents may perform mobile IP functions on behalf of WCDs, and connect to Internet/private network(s) 124 through home agent 122. If a foreign agent connects directly to a packet-switched network, then preferably the foreign agent performs typical remote access functions, such as assigning an HOA, a next-hop gateway IP address, and DNS server IP addresses to each WCD that the foreign agent serves. If the foreign agent instead performs mobile IP functions for a WCD, then home agent 112 may perform some, or all, of these remote access functions.

A home agent, such as home agent 122, is preferably an anchor point for WCDs that support mobile IP. As is described in Internet Request for Comments (RFC) 2002, "IP Mobility Support for IPv4," incorporated by reference herein, mobile IP is a well known network protocol that facilitates a WCD's accessing networks via a foreign agent 116, 118. The WCD may change its point of attachment from one foreign agent to another as it roams between wireless networks. In order to maintain a substantially static HOA, the WCD may receive an HOA assignment from a home agent.

For example, all communication between WCD 110 and Internet/private network(s) 124 may pass through home agent 122. Thus, the home agent and the WCD's serving foreign agent may use a tunnel to transport the WCD's communications. This tunnel may be an IP in IP tunnel, a generic routing encapsulation (GRE) tunnel, an IP security (IPsec) tunnel, or some other form of tunnel. In FIG. 1, such a tunnel is represented by the solid line connecting foreign agent 116 to home agent 122, and the solid line connecting foreign agent 118 to home agent 122.

As an illustrative example, WCD 110 may initially access wireless network 112, and perform mobile IP registration with foreign agent 116 and home agent 122. Preferably home agent 122 assigns an HOA to WCD 110. Then, the IP traffic originated by WCD 110 or destined to WCD 110 may traverse both foreign agent 116 and home agent 122 via a first tunnel. Accordingly, foreign agent 116 may maintain state associated with WCD 110, such as the HOA assigned to WCD 110 as well as the IP address of home agent 122. Also, home agent 122 may maintain state associated with WCD 110, such as the HOA assigned to WCD 110 as well as the IP address of foreign agent 116. If WCD 110 roams out of the coverage area of wireless network 112 and into the coverage area of wireless network 114, WCD 110 may, via foreign agent 118, update its mobile IP session with home agent 122. Preferably, home agent 122 maintains the same HOA assignment for WCD 110, even after the mobile IP session is updated. Then, the IP traffic originated by WCD 110 or destined to WCD 110 may traverse both foreign agent 118 and home agent 122 via a second tunnel, and the first tunnel is preferably torn down. Foreign agent 118 may maintain state associated with WCD 110, such as the HOA assigned to WCD 110 as well as the IP address of home agent 122. Home agent 122 may update its state associated with WCD 110, to reflect that WCD 110 is being served by foreign agent 118.

A home agent may perform other functions in addition to mobile IP. For instance, a home agent may perform deep packet inspection, content filtering, firewall, and/or quality of service functions. Furthermore, a home agent may perform virtual private network (VPN) functions on behalf of a WCD, supporting secure communication between the home agent and a third party VPN gateway, such as an enterprise gateway. For instance, a given WCD may be associated with an enterprise network, such as a corporate network. When the given WCD establishes a mobile IP session with a home agent, the home agent may responsively establish a secure tunnel from itself to a VPN gateway. Thus, communication originating from the WCD and destined to the enterprise network may traverse (1) the foreign agent, (2) the mobile IP tunnel between the foreign agent and the home agent, (3) the home agent, (4) the secure tunnel between the home agent and the VPN gateway, and (5) the VPN gateway. Conversely, communication originating from the enterprise network and destined to the WCD may traverse the same network elements in the opposite order.

A home agent may also authenticate WCDs, or, in conjunction with an authentication server, facilitate authentication of WCDs. An authentication server, such as authentication server 120, is typically a device that maintains a profile for each WCD registered with the operator of home agent 122. However, authentication server 120 may maintain profiles for other WCDs as well. Such a profile may contain an indication of the identity of each WCD and the WCD's subscriber. For example, a profile for a given WCD may include the given WCD's NAI(s), hardware identifier(s), international mobile subscriber identity (IMSI), username, password, and any other information, either general or specific to the given WCD.

When a WCD attempts to access a foreign agent 116, 118 or home agent 122, the foreign agent or home agent may transmit an access request message to authentication server 120. If authentication server 120 determines that the WCD is authorized to use the foreign agent and/or the home agent, and that the WCD presented an indication of the proper credentials (e.g., username and password), authentication server 120 may transmit an access accept message to the foreign agent or home agent, thus authenticating the WCD. If authentication server 120 determines that the WCD is not authorized to use the foreign agent and/or the home agent, authentication server 120 may instead transmit an access reject message to the foreign agent or home agent. Upon receipt of an access reject message, a foreign agent or a home agent may deny network access to the WCD.

Foreign agents and home agents may use one of the well known network protocols RADIUS (see for example, Internet RFC 2865, "Remote Authentication Dial In Subscriber Service (RADIUS)," incorporated herein by reference) or DIAMETER (see for example, Internet RFC 3588, "Diameter Base Protocol," incorporated herein by reference), to communicate with authentication servers. In FIG. 1, this interface is represented by the dashed lines connecting each of foreign agent 116, foreign agent 118, and home agent 122 with authentication server 120.

Authentication server 120 may also collect accounting information per WCD, typically from foreign agents and/or home agents. This accounting information may include the amount of data that the foreign agents and/or home agents have transferred on behalf of a WCD. Thus, this accounting information may incorporate the number of bytes transmitted in the forward direction to the WCD, the number of bytes received in the reverse direction from the WCD, the duration of the WCD's session with a wireless network, information about the wireless network's characteristics, and potentially other information as well.

The contents of an authentication server profile may contain more information relating to each WCD than is described here. Since the RADIUS and DIAMETER protocols are both extensible, virtually any type of information stored in an authentication server profile can be passed between authentication server 120 and other network devices. The totality of the accounting information gathered by authentication server 120, or parts thereof, may be used to generate billing records for WCDs.

Authentication server 120 may be divided, either physically or logically, into multiple entities. A home authentication server may be co-located with one or more home agents, and may maintain full profiles associated with WCDs. A visited authentication server is typically co-located with one or more foreign agents, and may be used by foreign agents as a proxy or broker service to a home authentication server. It should be understood that not all networks require all of these types of authentication servers. Furthermore, the visited authentication server, and home authentication server functions may be combined into the same physical device or devices, or separated into distinct software components or physical devices.

Although not shown in FIG. 1, wireless network 112 and wireless network 114 may contain various components such as BTSs, radio network controllers (RNCs), mobile switching centers (MSCs), and IP Multimedia Subsystem (IMS) servers. These components may be physically or logically separate elements, or may be combined with one another in various configurations. Furthermore, these components may operate in conjunction with one another to provide wireless network access to WCD 110 and other WCDs.

For example, a BTS may radiate to define one or more wireless coverage areas. Each wireless coverage area may provide air interface access to one or more WCDs. The air interface may include forward links for transmitting information from the BTS to a WCD (in the forward direction) and reverse links for transmitting information from a WCD to a BTS (in the reverse direction). BTSs and WCDs may exchange signaling, voice, data, video, or other media through the forward and reverse links.

An RNC may control multiple BTSs by determining how each BTS manages the WCDs in the BTS's wireless coverage areas. For example, an RNC may instruct a BTS to assign wireless channels to a WCD, increase or decrease power to a WCD, or hand off a WCD to a different BTS. Voice and data traffic to and from each WCD may flow through an RNC. Preferably, the RNC routes circuit-switched communications to an MSC and packet-switched communications to a foreign agent, such as a PDSN, or a similar device.

An MSC may perform some of the functions of a Class 5 telephony switch, but with additional functionality to manage the mobility of the end-subscriber devices, such as WCDs. For example, an MSC may comprise, or have access to, a visitor location register (VLR) and a home location register (HLR), and may facilitate short message service (SMS) functions. In general, an MSC may be responsible for switching functions, media transport functions, and managing the communications between WCDs and the publicly-switched telephone network (PSTN).

The components of FIG. 1 may each include at least one processor, data storage in the form of memory, and program instructions stored in the memory and executable by the at least one processor to carry out the functions described herein. Furthermore, these components may operate in accordance with various types of wireless protocols, such as Code Division Multiple Access (CDMA), Worldwide Interoperability for Microwave Access (WIMAX®), Universal Mobile Telecommunications System (UMTS), Long Term Evolution (LTE®), IEEE 802.11 (WIFE)), or other protocols now known or later developed.

In particular, WCDs using these wireless protocols could be wireless telephones, wireless personal digital assistants, wirelessly equipped laptop computers, wireless routers, or other types of mobile or fixed wireless devices. Preferably, a WCD is a subscriber device, which is manipulated by a human in order to establish circuit-based or packet-based voice and/or data calls into the RAN and core network. However, a WCD could also be an automated device without a human interface. Typically, a WCD is associated with one or more BTSs at a time and uses the wireless coverage areas of these BTSs to communicate with correspondent nodes, such as web servers, gaming servers, VoIP signaling proxies, VoIP bearer gateways, and other WCDs. A WCD may also support transferring its ongoing communication sessions from one wireless network to another in a handoff process.

II. Binding Databases and Profiles

FIG. 2A is an illustrative example of a home agent binding database 200. Such a binding database may maintain information associated with one or more WCDs that are using the home agent for mobile IP services. Accordingly, home agent binding database 200 may contain entries 210, 212, 214, 216 indicating a WCD's HOA, care of address (COA) and current NAI. Preferably, the HOA is an IP address that the home agent assigned to the WCD, the COA is an IP address of a foreign agent serving the WCD, and the NAI is an NAI that the WCD used to register with a wireless network and/or its serving foreign agent. Note that multiple WCDs may share the same COA. For instance, the WCDs associated with entries 210 and 212 both have a COA of 192.168.1.2, indicating that these WCDs are both associated with the same foreign agent. Similarly, though not show in FIG. 2A, two WCDs that are associated with different foreign agents may share the same HOA.

FIG. 2B is an illustrative example of authentication server profile database 225. Such a profile database may maintain information associated with one or more WCDs. For instance, authentication server profile database 225 may contain entries 230, 232, 234, 236 that each contain one or more NAIs associated with a WCD. Each NAI associated with a given WCD may be an NAI that the given WCD may use to access a specific wireless network or networks.

Although home agent binding database 200 and authentication server profile database 225 only contain four entries each, these databases could contain arbitrarily large numbers of entries. For instance, in a major wireless network, an authentication server may have access to a profile database including tens of millions of entries or more. Furthermore, these databases may contain more information not shown in FIG. 2A or 2B. For instance, authentication server profile database 225 may contain additional dynamic information related to WCDs, such as a WCD's current HOA or COA. Authentication server profile database 225 may also contain additional static information related to WCDs, such as a WCD's hardware identifier, permitted applications, maximum data rate, and so on.

Each of home agent binding database 200 and authentication server profile database 225 may be indexed by one or more fields. These fields may either be shown or may not be shown in FIGS. 2A and 2B. For instance, home agent binding database 200 may be indexed by its HOA field. In such a case, home agent binding database 200 may accept an HOA as a query, and if that HOA exists in home agent binding database 200, return the COA and/or NAI associated with that HOA.

Moreover, even though home agent binding database 200 and authentication server profile database 225 are each referred to as a "database," either or both may in fact be a database or some other arrangement of stored information. For example, these "databases" may be actual databases, such as structured query language (SQL) databases. Or, they each may be a computer file, or an arrangement of computer files in one or more file systems. Various types of data structures may store the information in such a database, including but not limited to array, lists, tree, and tuples. Furthermore, these databases may be monolithic or distributed across multiple devices in a network.

III. Exemplary Transactions to Support Multiple NAIs Per WCD

A WCD may use different NAIs at various points in time. For example, a WCD may use a first NAI to access a first wireless network, and the WCD may use a second NAI to access a second wireless network. These wireless networks may be operated by the same business entity or by different business entities. Additionally, the WCD may use both NAIs to access the same wireless network, for the purpose of accessing different services.

For instance, a first wireless network operator may provide a legacy 3G network. The first wireless network operator may be associated with a second wireless network operator that provides a newer 4G network. The 4G network may overlay at least part of the coverage area of the 3G network. The first wireless network operator may provide a WCD with a first NAI to use when the WCD is accessing the 3G network. Likewise, the second wireless network operator may provide the WCD with a second NAI to use when the WCD is accessing the 4G network. However, the WCD may be associated with a single home agent that will support the WCD's communication needs regardless of whether the WCD uses the 3G network or the 4G network. Accordingly, it is beneficial for a home agent and/or an authentication server to support multiple NAIs per WCD, such that the WCD's mobile IP binding can be maintained even as the WCD's NAI changes. In this way, even as a WCD is handed off between the 3G and 4G networks, the WCD's communication sessions are preserved.

Figure 3:
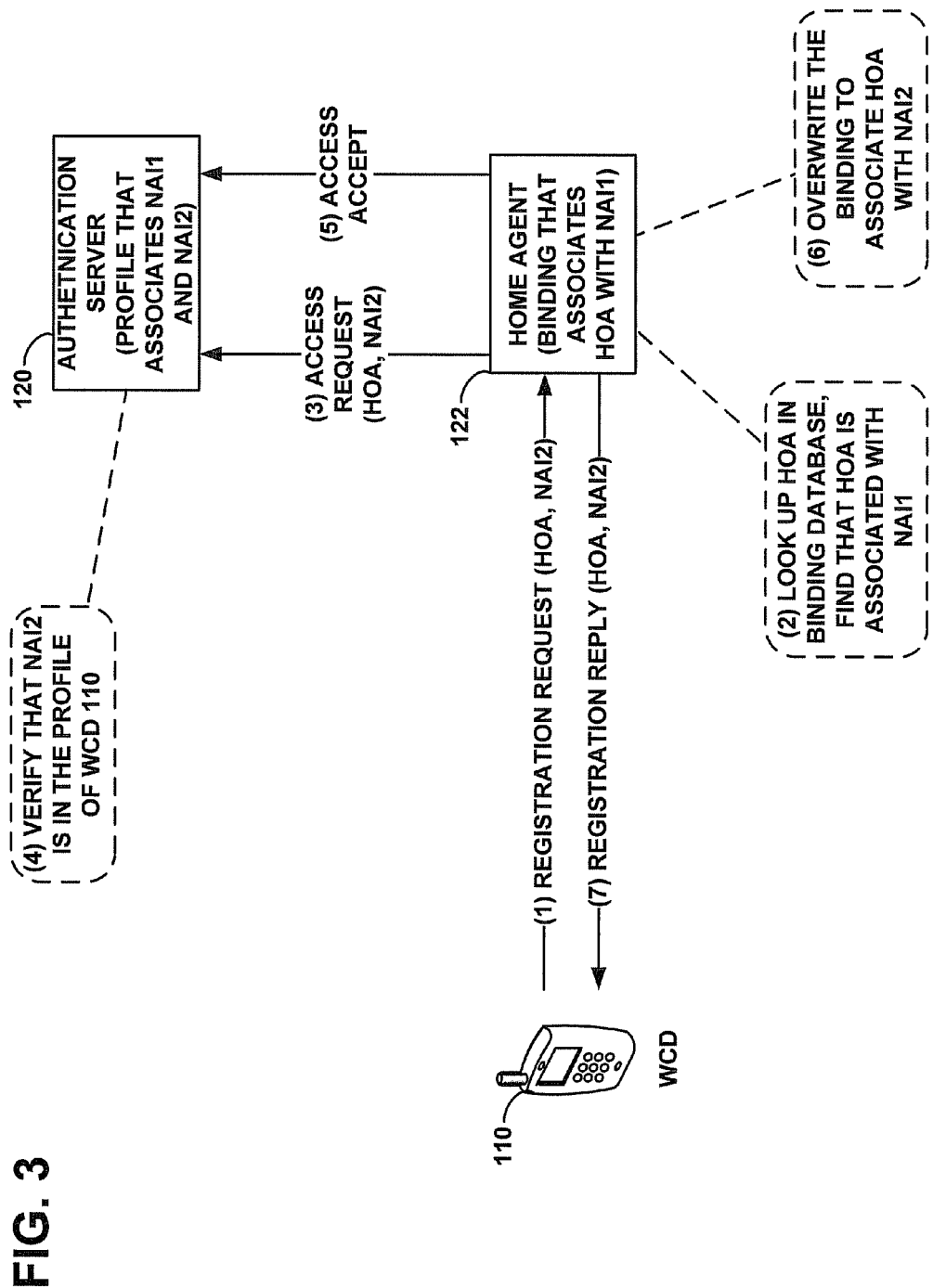
FIG. 3 is a message flow diagram of a method in accordance with an exemplary embodiment.

FIG. 3 depicts a series of communicative and processing steps through which this goal may be achieved. FIG. 3 assumes that WCD 110 has a current mobile IP registration with home agent 122, and that home agent 122 contains a binding that associates an HOA of WCD 110 with a first NAI, NAI1. At step (1), WCD 110 may transmit a mobile IP registration request message to home agent 122. Preferably, this registration request message contains the HOA, as well as a second NAI, NAI2. Thus, WCD 110 may be seeking to update its mobile IP registration to reflect that WCD 110 is using NAI2.

At step (2), home agent 122 may look up the HOA in a binding database associated with home agent 122, and home agent 122 may find that the HOA is associated with NAI1. At this point, home agent 122 may not be able to determine whether WCD 110 is permitted to use NAI2, because home agent 122 may only store one HOA-NAI binding at a time for a given WCD. Thus, at step (3), home agent 122 transmits an access request message containing at least the HOA and NAI2 to authentication server 120. This access request message may also contain NAI1. After receiving the access request message, authentication server 120, at step (4), may verify that NAI2 is in the authentication server profile of WCD 110. To do so, authentication server 120 may look up the authentication server profile of WCD 110 in an authentication server profile database. Assuming that NAI2 exists in the authentication server profile of WCD 110, authentication server 120, at step (5), may transmit an access accept message to home agent 122. The access accept message may include one or more of NAI1, NAI2, the HOA, or the access accept message may contain none of these identifiers.

At step (6), home agent 122 may overwrite the binding for WCD 110 in the binding database such that the binding reflects that WCD 110 is using NAI2. This step may involve, for example, home agent 122 overwriting NAI1 with NAI2. Then, at step (7), home agent 122 may transmit a registration reply message to WCD 110. The registration reply message may contain the HOA and NAI2, and may serve to inform WCD 110 that the binding has been updated and maintained. Thus, home agent 122 has successfully maintained an HOA for WCD 110, despite WCD 110 changing NAIs.

Figure 4B:
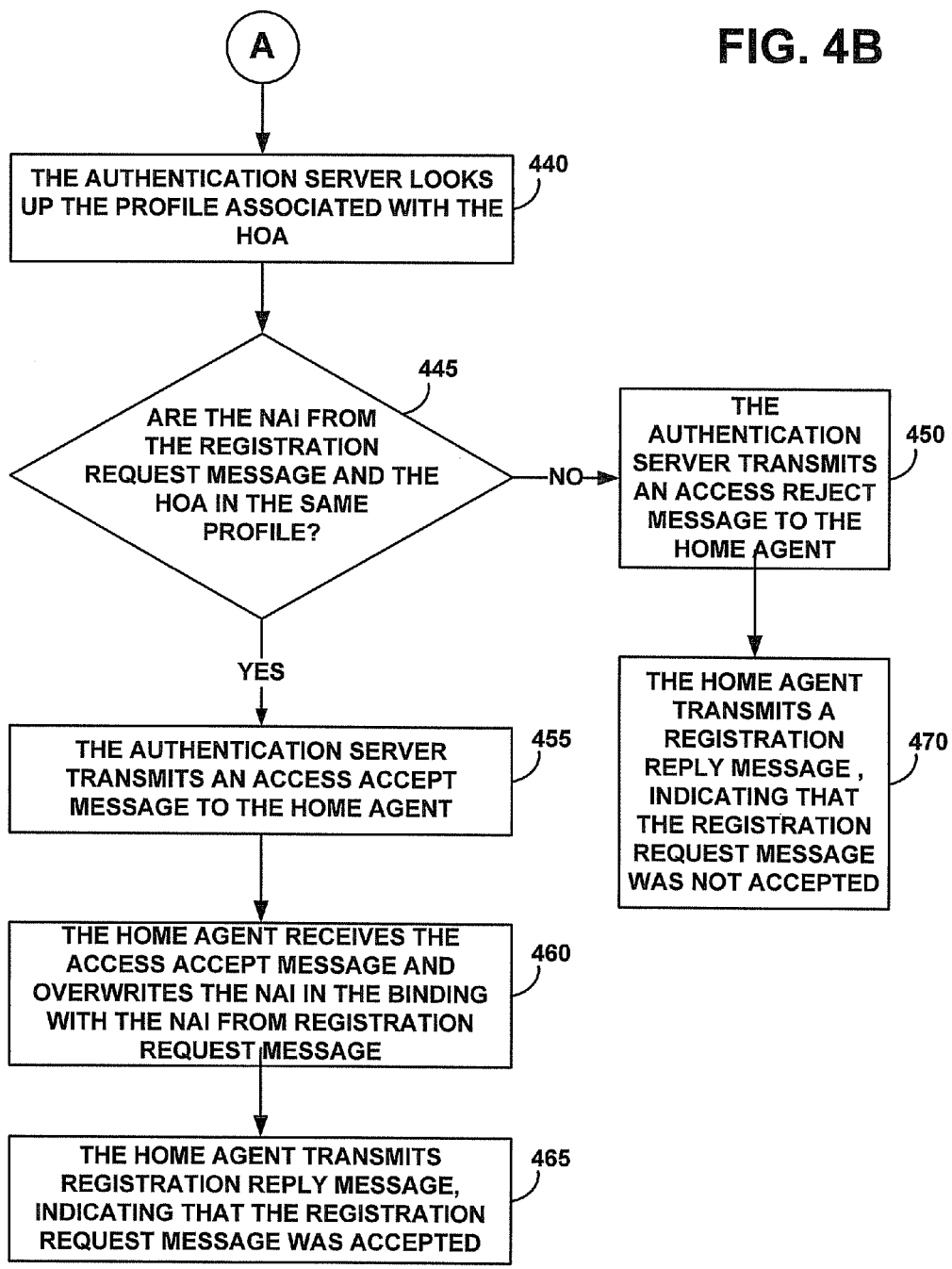

FIG. 3 illustrates, from a system point of view, how WCD 110 can continue using its HOA with NAI2. FIGS. 4A and 4B are flow charts of method 400, illustrating steps that may occur at home agent 122 and authentication server 120 in order to achieve the same or a similar goal.

At step 405, home agent 122 receives a first registration request message containing an HOA and an NAI. Preferably, this first registration request message is a mobile IP registration request message, and may contain more information than just the HOA and NAI. Regardless, at step 410, home agent 122 may look up the HOA in a home agent binding database that associates HOAs and NAIs. The database may be indexed by its HOA field. At step 415, home agent 122 determines whether an entry containing the HOA is found in the database.

If an entry containing the HOA is not found in the database, then at step 420, home agent 122 may treat the registration request message as a request to establish a new session, preferably a mobile IP session, with home agent 122. Accordingly, home agent 122 may then conduct procedures to establish a new mobile IP session based at least on information in the registration request message. Preferably, this new mobile IP session is represented by a new binding in home agent 122 that associates the HOA and the NAI.

However, if an entry containing the HOA is found in the database, then at step 425, home agent 122 may determine whether the NAI contained in the registration request message matches the NAI associated with the HOA in the binding database. If the two NAIs match, then at step 430, home agent 122 may treat the registration request message as renewing the existing binding. Accordingly, home agent 122 may then conduct procedures to renew the mobile IP session associated with the HOA.

However, if the two NAIs do not match, then at step 435, home agent 122 may treat the registration request message as seeking to maintain the binding by associating the HOA with the NAI from the registration request message. In order to do so, home agent 122 may first determine that the NAI currently in the binding and the NAI contained in the registration request message are both associated with the same WCD. If home gent 122 does not make this determination and instead overwrites the NAI in the binding with the NAI contained in the registration request message, then it is possible for the session associated with the binding to be hijacked.

Hijacking a session such as a mobile IP session, at a home agent, occurs when a first WCD has a valid session registered at the home agent, but that session is "taken over" by a second WCD without permission to do so from the first WCD. Such hijacking can have the undesirable result that the second WCD could receive information that was intended only for the first WCD.

For example, assume that the home agent stores a binding in its binding database that associates a first WCD's HOA with a first NAI. Assume further that a second WCD transmits a registration request message to the home agent containing the HOA and a second NAI. If the home agent accepts this registration request message and overwrites the first NAI with the second NAI in the binding, then the second WCD has effectively taken over the first WCD's binding. Furthermore, if the home agent updates the COA in the binding to reference the second WCD's foreign agent, then the second WCD may receive information that was intended for the first WCD.

In order to avoid hijacking, home agent 122 may validate the information in the registration request message that it received at step 405. Thus, at step 435, home agent 122 may transmit an access request message containing at least the HOA and the NAI from the registration request message to an authentication server. The access request message may optionally contain the NAI from the binding as well. Turning to FIG. 4B, at step 440, the authentication server may look up the authentication server profile associated with the HOA. If the authentication server determines that the profile containing the HOA also contains the NAI from the registration request message, then at step 455 the authentication server may transmit an access accept message to home agent 122, indicating that the NAI in the registration request message has been validated. Alternatively, if home agent 122 includes the NAI from the binding in the access request message, then the authentication server may look up the authentication server profile using either the NAI from the binding or the NAI from the registration request message. If both of these NAIs are contained in the profile, then at step 455, the authentication server may transmit an access accept message to the home agent. The access accept may contain one or more of (1) the NAI from the registration request message, (2) the NAI from the binding, and (3) the HOA. Alternatively, the access accept message may contain additional information as well.

At step 460, home agent 122 may receive the access accept message. Preferably, home agent 122 interprets the access accept message as indicating that the information in the registration request message is validated. Thus, home agent 122 may overwrite the NAI in the binding with the NAI from the registration request message. Furthermore, home agent 122 may also overwrite the COA in the binding with a COA from the registration request message. At step 465, home agent 122 may transmit a registration reply message to the originator of the registration request message, indicating that the home agent has updated the binding with the NAI from the registration request message, thus maintaining the mobile IP session associated with the binding.

On the other hand, if at step 445 the authentication server determines that the NAI from the registration request message is not associated with the HOA or the NAI from the binding, the authentication server may, at step 450, transmit an access reject message to home agent 122. This access reject message may serve to indicate that the information in the registration request message has not been validated. Accordingly, home agent 122 may consider the registration request message as being a potential hijacking attack, and may not update the binding with any of the information from the registration request message. At step 470, home agent 122 may transmit a registration reply message to the originator of the registration request message, indicating that the binding at home agent 122 has not been updated. Alternatively, home agent 122 may silently discard the registration request message, by not responding to it at all.

Method 400 serves to illustrate means through which a home agent and an authentication server can facilitate maintaining a session between a WCD and the home agent even if the WCD changes the NAI that it is using. In addition to the procedures illustrated by method 400, the embodiments herein may be used to address other scenarios where a WCD moves between wireless networks, changing its NAI from wireless network to wireless network.

For instance, a WCD may initially use a first NAI to access a first wireless network. The WCD may also use the first NAI to establish a session, via the first wireless network, with a home agent. Then, if the WCD roams to a second wireless network, the WCD may begin using a second NAI to access this second wireless network. Accordingly, the WCD may attempt to update its session with the home agent to reflect that the WCD is using the second NAI. Furthermore, at some later point in time, the WCD may eventually roam back to the first wireless network, and may attempt to update its session with the home agent to reflect that the WCD is once again using the first NAI. Alternatively, the WCD may roam to a third wireless network, and the WCD may begin using a third NAI to access this third wireless network. Accordingly, the WCD may attempt to update its session to reflect that the WCD is using the third NAI. However, each time the WCD attempts update its session with a new NAI, the home agent may take steps to validate the new NAI, in order to avoid hijacking attempts. FIGS. 5A-5D illustrate methods that may be performed by a home agent to accomplish these goals.

Figure 5A:
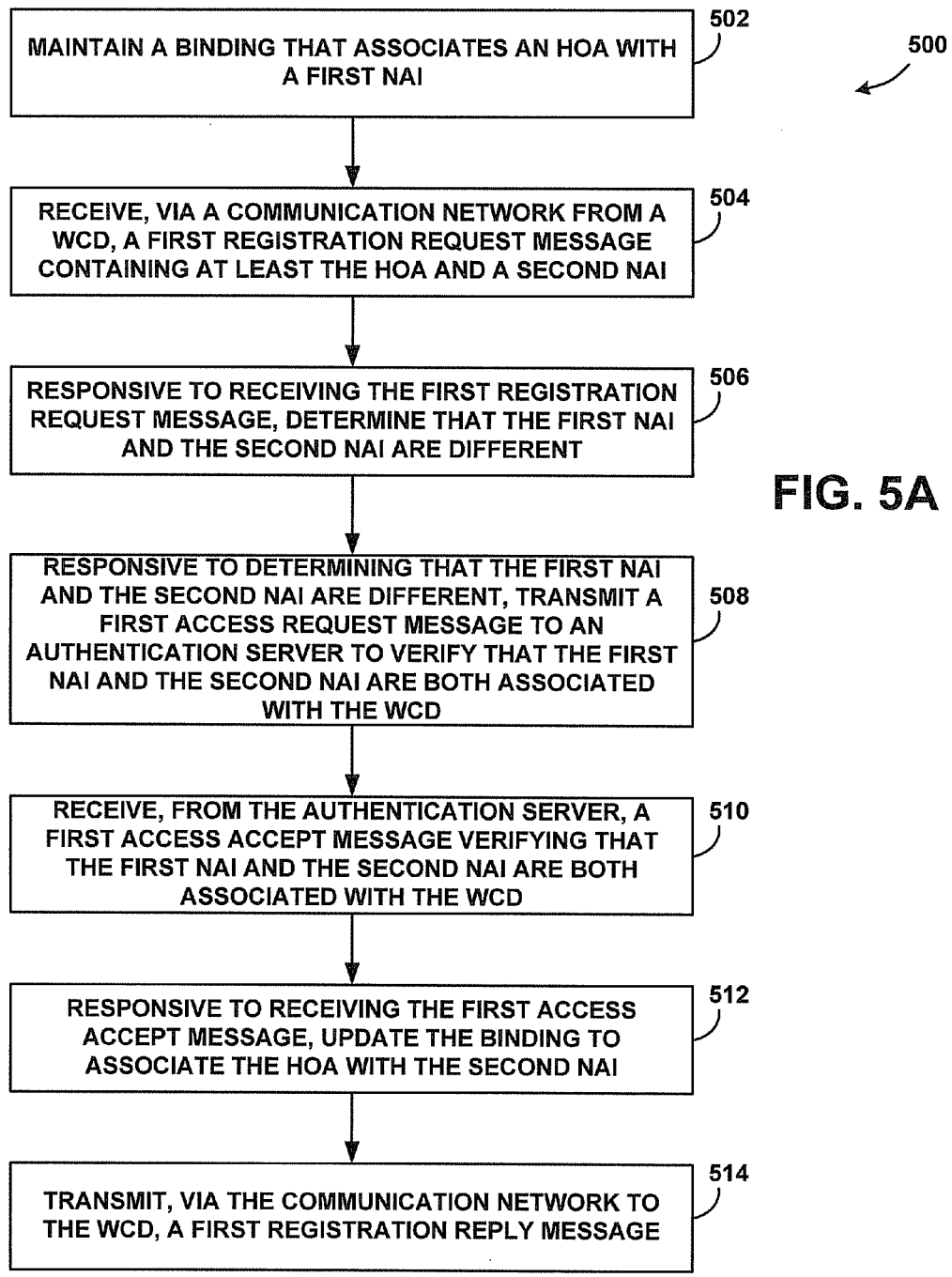

FIG. 5A illustrates method 500 that may be performed by a home agent. Method 500 is one way in which a home agent can change the NAI associated with a WCD from a first NAI to a second NAI, while maintaining a binding for a session between the WCD and the home agent. At step 502, a home agent maintains a binding that associates an HOA with a first NAI. The binding may be a binding for a mobile IP session between a WCD and the home agent. The binding may also contain other information such as a COA associated with the WCD's current foreign agent.

At step 504, the home agent receives a first registration request message, containing at least the HOA and a second NAI. This first registration request message may be a mobile IP message transmitted by the WCD to maintain the session between the WCD and the home agent. For instance, the first registration request message may be indicative of the WCD being handed off from a first wireless network to a second wireless network, and the WCD beginning to use the second NAI in conjunction with accessing the second wireless network.

At step 506, responsive to receiving the first registration request message, the home agent may determine that the first NAI and the second NAI are different. To do so, the home agent may look up the binding in a binding database and determine that the second NAI does not appear in the binding. For instance, the home agent may (i) look up the binding, using the HOA as a key, in the database of bindings, (ii) find the binding in the database, and (iii) compare the first NAI, as it appears in the binding, to the second NAI, thereby determining that the first NAI and the second NAI are different. Then, at step 508, responsive to determining that the first NAI and the second NAI are different, the home agent may transmit a first access request message to an authentication server to determine whether the first NAI and the second NAI are both associated with the WCD.

At step 510, the home agent may receive, from the authentication server, a first access accept message verifying that the first NAI and the second NAI are both associated with the WCD. In response to receiving the first access accept message, at step 512, the home agent may update the binding to associate the HOA with the second NAI. This updating may involve the home agent overwriting the first NAI in the binding with the second NAI. However, the home agent may update other information in the binding as well. For instance, the home agent may update the COA in the binding with a COA that was contained in the second registration request message. After updating the COA, the home agent may transmit bearer traffic to the WCD via a second tunnel, where the foreign agent associated with the COA that was contained in the second registration request message may be the endpoint of the tunnel. At step 514, the home agent may transmit a first registration reply message to the WCD. This registration reply message may be a mobile IP message, and it may inform the WCD that the session between the WCD and the home agent has been maintained.

Figure 5B:
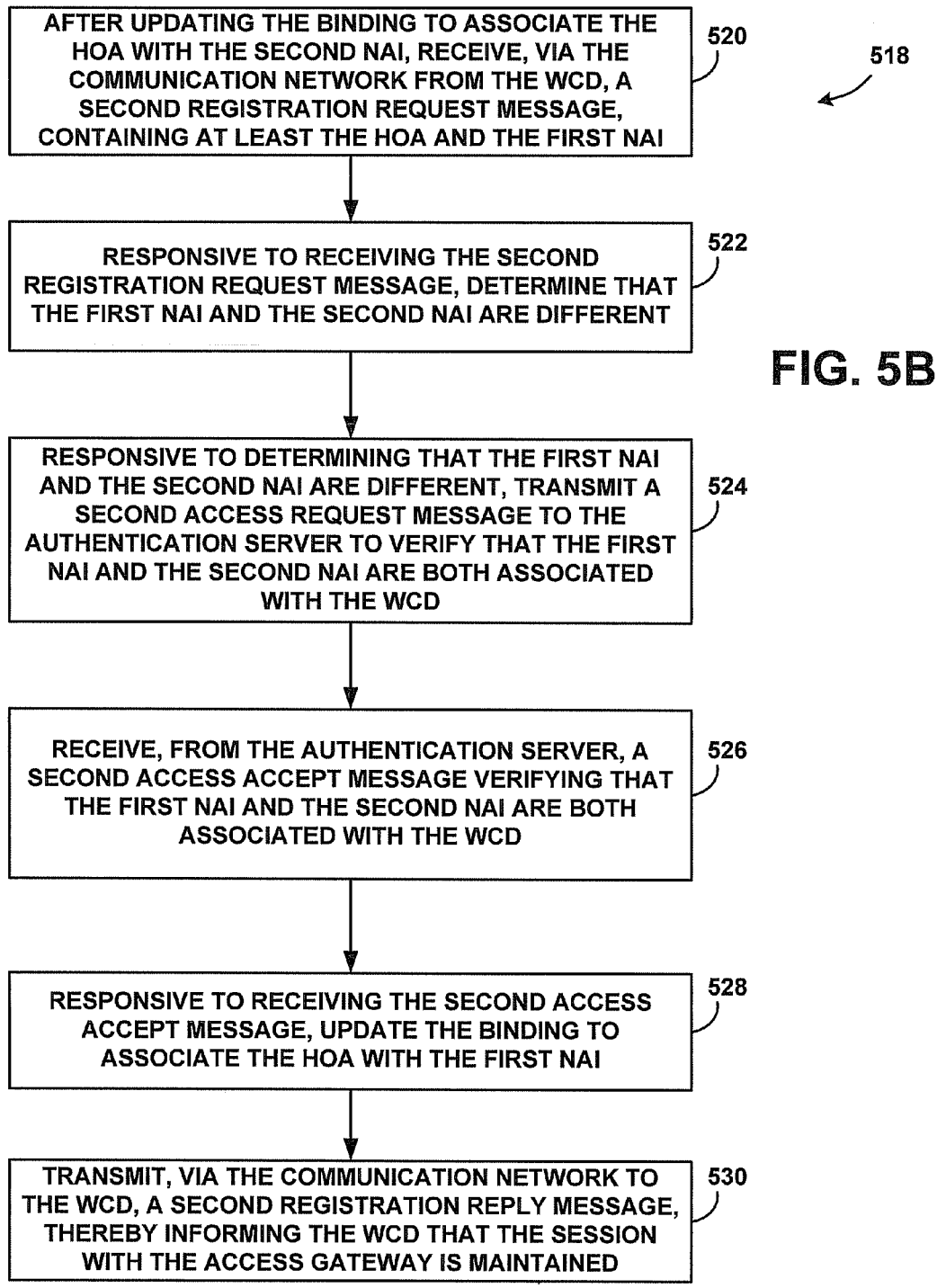

FIG. 5B is a flow chart depicting method 518. Preferably, method 518 continues from where method 500 leaves off. At step 520, after updating the binding to associate the HOA with the second NAI, the home agent may receive a second registration request message. This second registration request message may be a mobile IP message and may contain at least the HOA and the first NAI. For instance, the second registration request message may be indicative of the WCD being handed off from the second wireless network back to the first wireless network, and beginning to use the first NAI once again in conjunction with accessing the first wireless network.

At step 522, responsive to receiving the second registration request message, the home agent may determine that the first NAI and the second NAI are different. At step 524, responsive to this determination, the home agent may transmit a second access request message to the authentication server to verify that the first NAI and the second NAI are both associated with the WCD.

At step 526, the home agent may receive, from the authentication server, a second access accept message verifying that the first NAI and the second NAI are both associated with the WCD. In response to receiving the second access accept message, the home agent may, at step 528, update the binding to associate the HOA with the first NAI. This updating may involve the home agent overwriting the second NAI in the binding with the first NAI. However, the home agent may update other information in the binding as well.

At step 530, the home agent may transmit a second registration reply message to the WCD. This second registration reply message may be a mobile IP message, and it may inform the WCD that the session between the WCD and the home agent has been maintained.

Figure 5C:
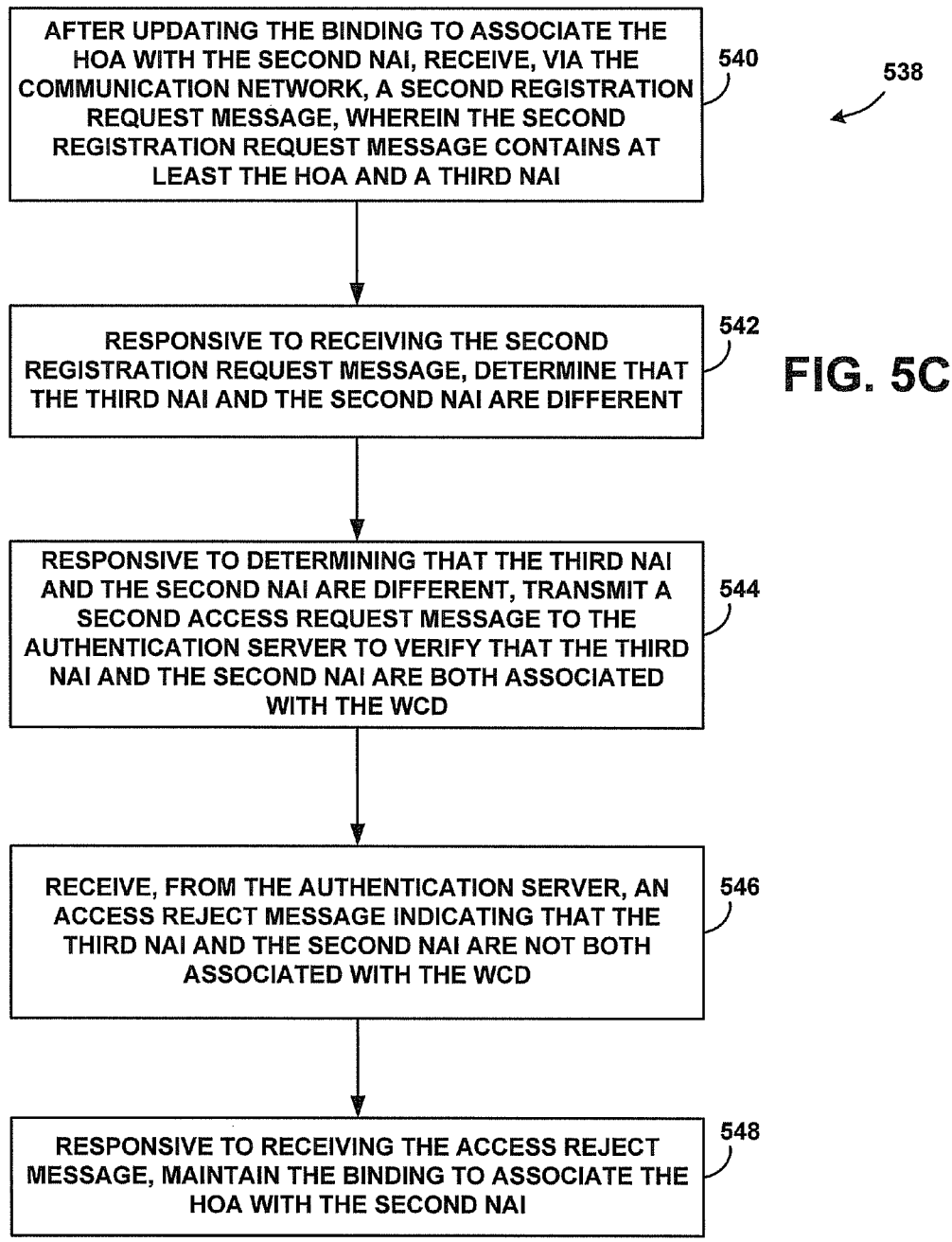

FIG. 5C is a flow chart depicting method 538. Preferably, method 538 continues from where method 500 leaves off. At step 540, after updating the binding to associate the HOA with the second NAI, the home agent may receive a second registration request message. This second registration request message may be a mobile IP message and may contain at least the HOA and a third NAI. At step 542, responsive to receiving the second registration request message, the home agent may determine that the third NAI and the second NAI are different. Responsive to this determination, at step 544 the home agent may transmit a second access request message to the authentication server to verify that the third NAI and the second NAI are both associated with the WCD.

At step 546, the home agent may receive, from the authentication server, an access reject message. This access reject message may indicate that the third NAI and the second NAI are not both associated with the WCD. The authentication server may make this determination, for example, by looking up the profile associated with the HOA and/or the second NAI, and finding that the third NAI is not associated with this profile.

At step 548, responsive to receiving the access reject message, the home agent may maintain the binding to associate the HOA with the second NAI. The home agent may regard the access reject message as indicative that the second registration request message is a hijacking attempt from an entity other than the WCD. Thus, the home agent may not update the binding. The home agent may optionally transmit a registration reply message indicating that the binding was not updated to the entity that transmitted the registration request message.

Figure 5D:
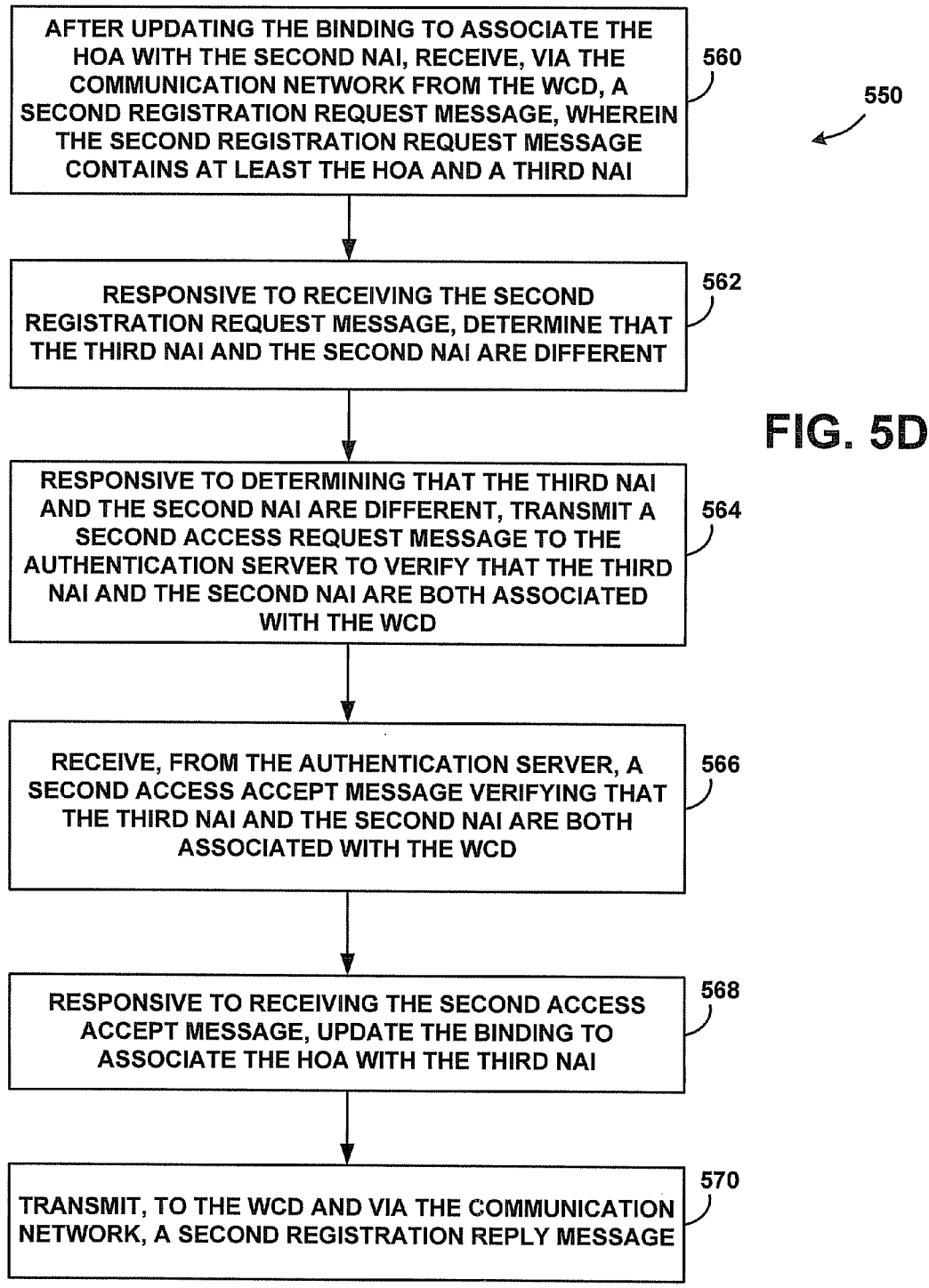

On the other hand, FIG. 5D is a flow chart depicting method 550. Preferably, method 550 also continues from where method 500 leaves off Method 550 is similar to method 538, in that the home agent receives a registration request message containing a third NAI, but in this case, the home agent is able to verify that the third NAI is also associated with the WCD.

Thus, at step 560, after updating the binding to associate the HOA with the second NAI, the home agent may receive a second registration request message. This second registration request message may be a mobile IP message and may contain at least the HOA and a third NAI. At step 562, responsive to receiving the second registration request message, the home agent may determine that the third NAI and the second NAI are different. Responsive to this determination, at step 564 the home agent may transmit a second access request message to the authentication server to verify that the third NAI and the second NAI are both associated with the WCD.

At step 566, the home agent may receive, from the authentication server, a second access accept message verifying that the third NAI and the second NAI are both associated with the WCD. Responsive to receiving the second access accept message, the home agent may, at step 568, update the binding to associate the HOA with the third NAI. This updating may involve the home agent overwriting the second NAI in the binding with the third NAI. However, the home agent may update other information in the binding as well.

At step 570, the home agent may transmit a second registration reply message to the WCD. This registration reply message may be a mobile IP message, and it may inform the WCD that the session between the WCD and the home agent has been updated and maintained.

It should be understood that the methods, processes, and transactions presented here may be represented by the respective sequences of steps or events reflected in the preceding figures. However, these steps or events may occur in a different order, and fewer or more steps or events may occur without departing from the scope of the embodiments. Moreover, the methods, processes, and transactions depicted in these figures may be combined with one another wholly or in part, to form additional embodiments that are also within the scope of this invention. It should be also understood that the types and names of the various messages discussed herein are merely referential. Other types of messages, as well as messages with other names, may be used without departing from the scope of the invention.

IV. Exemplary Home Agent

Figure 6:
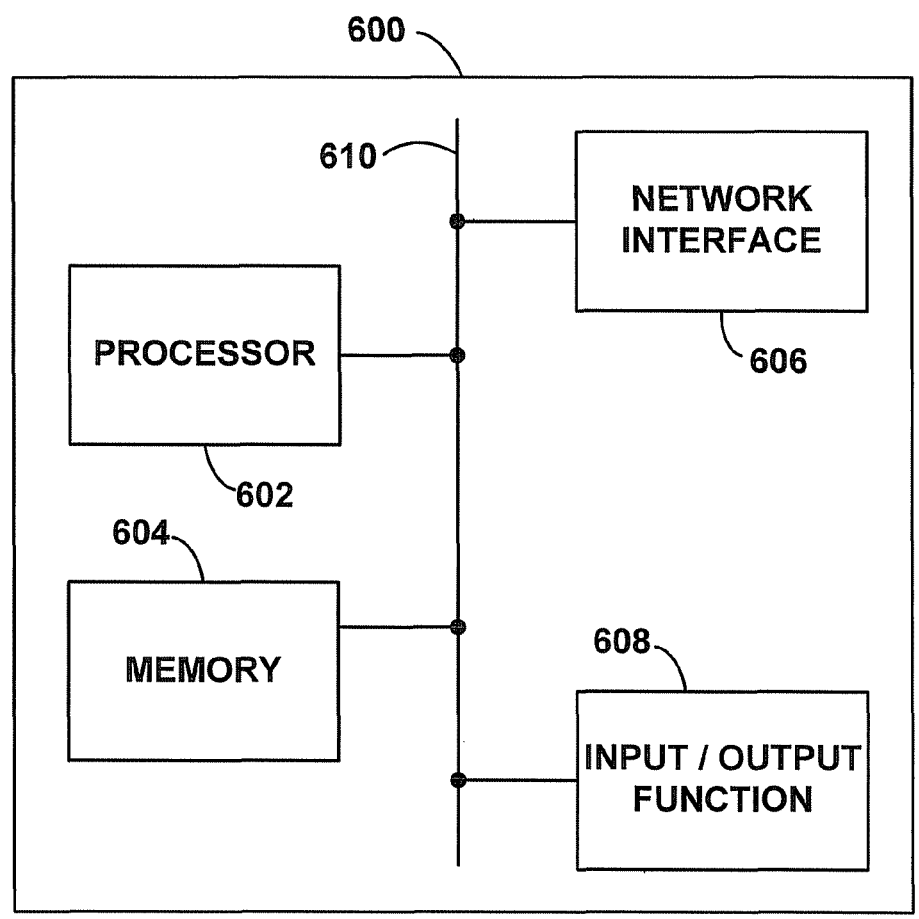
FIG. 6 is a block diagram of a home agent in accordance with an exemplary embodiment.

FIG. 6 is a simplified block diagram depicting exemplary home agent 600. FIG. 6 illustrates some of the functional components that would likely be found in a home agent arranged to operate in accordance with the embodiments herein. Example home agent 600 preferably includes a processor 602, a memory 604, a network interface 606, and an input/output function 608, all of which may be coupled by a system bus 610 or a similar mechanism.

Processor 602 preferably includes one or more CPUs, such as one or more general purpose processors and/or one or more dedicated processors (e.g., application specific integrated circuits (ASICs) or digital signal processors (DSPs), etc.) Memory 604, in turn, may comprise volatile and/or non-volatile memory and can be integrated in whole or in part with processor 602. Memory 604 preferably holds program instructions executable by processor 602, and data that is manipulated by these instructions, to carry out various functions described herein. Alternatively, the functions can be defined by hardware, firmware, and/or any combination of hardware, firmware and software.

Network interface 606 may take the form of a wireline connection, such as an Ethernet, Token Ring, SONET, or T-carrier connection. Network interface 606 may also take the form of a wireless connection, such as IEEE 602.11, BLUETOOTH®, CDMA, WIMAX®, UMTS®, LTE®, or any other interface used to communicate with client nodes. However, other forms of physical layer connections and other types of standard or proprietary communication protocols may be used over network interface 606. Furthermore, network interface 606 may comprise multiple physical or logical network interfaces, each capable of operating according to the same or different protocols.

Input/output function 608 facilitates user interaction with example access node 600. Input/output function 608 may comprise multiple types of input devices, such as a keyboard, a mouse, a touch screen, and so on. Similarly, input/output function 608 may comprise multiple types of output devices, such as a monitor, printer, or one or more light emitting diodes (LEDs). Additionally or alternatively, example home agent 600 may support remote access from another device, via network interface 606 or via another interface (not shown), such an RS-232 port.

By way of example, the data in memory 604 may contain information associated with performing any of the methods, processes, or functions described herein. For example, memory 604 may contain a home agent database containing one or more entries. Memory 604 may also contain program logic that is executable by processor 602 to perform any of the methods, processes, or functions presented herein or represented by any of the accompanying figures.

V. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method, performed in a home agent, wherein the home agent is communicatively coupled to an authentication server and to a wireless communication device (WCD), and wherein the home agent contains a binding that associates a home address (HOA) with a first network access identifier (NAI), the method comprising:

receiving, via a communication network from the WCD, a first registration request message, wherein the first registration request message contains at least the HOA and a second NAI, and wherein the WCD is seeking to maintain a session with the home agent;

responsive to receiving the first registration request message, determining that the first NAI and the second NAI are different;

responsive to determining that the first NAI and the second NAI are different, transmitting a first access request message to the authentication server to verify that the first NAI and the second NAI are both associated with the WCD;

receiving, from the authentication server, a first access accept message verifying that the first NAI and the second NAI are both associated with the WCD;

responsive to receiving the first access accept message, updating the binding to associate the HOA with the second NAI; and transmitting, via the communication network to the WCD, a first registration reply message, thereby informing the WCD that the session with the home agent is maintained.

2. The method of claim 1, wherein receiving the first registration request message containing at least the HOA and the second NAI is indicative of the WCD handing off from a first wireless network to a second wireless network.

3. The method of claim 1, further comprising:

after updating the binding to associate the HOA with the second NAI, receiving, via the communication network from the WCD, a second registration request message, wherein the second registration request message contains at least the HOA and the first NAI, and wherein the WCD is seeking to maintain the session with the home agent;

responsive to receiving the second registration request message, determining that the first NAI and the second NAI are different;

responsive to determining that the first NAI and the second NAI are different, transmitting a second access request message to the authentication server to verify that the first NAI and the second NAI are both associated with the WCD;

receiving, from the authentication server, a second access accept message verifying that the first NAI and the second NAI are both associated with the WCD;

responsive to receiving the second access accept message, updating the binding to associate the HOA with the first NAI; and transmitting, via the communication network to the WCD, a second registration reply message, thereby informing the WCD that the session with the home agent is maintained.

4. The method of claim 3, wherein receiving the second registration request message containing at least the HOA and the first NAI is indicative of the WCD handing off from a second wireless network to a first wireless network.

5. The method of claim 1, further comprising:

after updating the binding to associate the HOA with the second NAI, receiving, via the communication network, a second registration request message, wherein the second registration request message contains at least the HOA and a third NAI;

responsive to receiving the second registration request message, determining that the third NAI and the second NAI are different;

responsive to determining that the third NAI and the second NAI are different, transmitting a second access request message to the authentication server to verify that the third NAI and the second NAI are both associated with the WCD;

receiving, from the authentication server, an access reject message indicating that the third NAI and the second NAI are not both associated with the WCD; and responsive to receiving the access reject message, maintaining the binding to associate the HOA with the second NAI.

6. The method of claim 1, further comprising after updating the binding to associate the HOA with the second NAI, receiving, via the communication network from the WCD, a second registration request message, wherein the second registration request message contains at least the HOA and a third NAI, and wherein the WCD is seeking to maintain the session with the home agent;

responsive to receiving the second registration request message, determining that the third NAI and the second NAI are different;

responsive to determining that the third NAI and the second NAI are different, transmitting a second access request message to the authentication server to verify that the third NAI and the second NAI are both associated with the WCD;

receiving, from the authentication server, a second access accept message verifying that the third NAI and the second NAI are both associated with the WCD;

responsive to receiving the second access accept message, updating the binding to associate the HOA with the third NAI; and transmitting, to the WCD and via the communication network, a second registration reply message, thereby informing the WCD that the session with the home agent is maintained.

7. The method of claim 1, wherein the binding is maintained in a database of bindings, and wherein determining that the first NAI and the second NAI are different comprises:

looking up the binding, using the HOA as a key, in the database of bindings;

finding the binding in the database; and comparing the first NAI, as it appears in the binding, to the second NAI.

8. The method of claim 1, wherein updating the binding to associate the HOA with the second NAI comprises:

overwriting the first NAI in the binding with the second NAI.

9. The method of claim 1, wherein the binding also contains a first care of address (COA) associated with both the HOA and the first NAI, the method further comprising:

transmitting bearer traffic to the WCD via a first tunnel, wherein the first COA is an endpoint of the first tunnel.

10. The method of claim 9, wherein the first registration request message also contains a second COA, wherein updating the binding to associate the HOA with the second NAI comprises:

overwriting the first COA in the binding with the second COA; and transmitting bearer traffic to the WCD via a second tunnel, wherein the second COA is an endpoint of the second tunnel.

11. A home agent communicatively coupled to an authentication server and to a wireless communication device (WCD), the home agent comprising:

a memory containing at least a binding that associates a home address (HOA) with a first network access identifier (NAI);

a first logical interface for communicating with the WCD;

a second logical interface for communicating with the authentication server;

a processor, capable of executing program logic, stored in the memory, to perform the functions of (1) receiving, via the first logical interface, a first registration request message containing at least the HOA and a second NAI, (2) responsive to receiving the first registration request message, determining that the first NAI and the second NAI are different, (3) responsive to determining that the first NAI and the second NAI are different, transmitting, via the second logical interface, a first access request message to verify that the first NAI and the second NAI are both associated with the WCD, (4) receiving, via the second logical interface, a first access accept message verifying that the first NAI and the second NAI are both associated with the WCD, (5) responsive to receiving the first access accept message, updating the binding to associate the HOA with the second NAI in the first memory, and (6) transmitting, via the first logical interface, a first registration reply message, thereby informing the WCD that the binding has been updated.

12. The home agent of claim 11, wherein the first registration request message containing at least the HOA and the second NAI is indicative of the WCD handing off from a first wireless network to a second wireless network.

13. The home agent of claim 11, wherein the processor is also capable of executing program logic, stored in the memory, to perform the functions of (1) after updating the binding to associate the HOA with the second NAI, receiving, via the first logical interface, a second registration request message containing at least the HOA and the first NAI, (2) responsive to receiving the second registration request message, determining that the first NAI and the second NAI are different, (3) responsive to determining that the first NAI and the second NAI are different, transmitting, via the second logical interface, a second access request message to verify that the first NAI and the second NAI are both associated with the WCD, (4) receiving, via the second logical interface, a second access accept message verifying that the first NAI and the second NAI are both associated with the WCD, (5) responsive to receiving the second access accept message, updating the binding to associate the HOA with the first NAI, and (6) transmitting, via the first logical interface, a second registration reply message, thereby informing the WCD that the binding has been updated.

14. The home agent of claim 11, wherein the processor is also capable of executing program logic, stored in the memory, to perform the functions of (1) after updating the binding to associate the HOA with the second NAI, receiving, via the first logical interface, a second registration request message containing at least the HOA and a third NAI, (2) responsive to receiving the second registration request message, determining that the third NAI and the second NAI are different, (3) responsive to determining that the third NAI and the second NAI are different, transmitting, via the second logical interface, a second access request message to verify that the third NAI and the second NAI are both associated with the WCD, (4) receiving, via the second logical interface, an access reject message indicating that the third NAI and the second NAI are not both associated with the WCD, and (5) responsive to receiving the access reject message, maintaining the binding to associate the HOA with the second NAI.

15. The home agent of claim 11, wherein the processor is also capable of executing program logic, stored in the memory, to perform the functions of (1) after updating the binding to associate the HOA with the second NAI, receiving, via the first logical interface, a second registration request message containing at least the HOA and a third NAI, (2) responsive to receiving the second registration request message, determining that the third NAI and the second NAI are different, (3) responsive to determining that the third NAI and the second NAI are different, transmitting, via the second logical interface, a second access request message to the authentication server to verify that the third NAI and the second NAI are both associated with the WCD, (4) receiving, via the second logical interface, a second access accept message verifying that the third NAI and the second NAI are both associated with the WCD, (5) responsive to receiving the second access accept message, updating the binding to associate the HOA with the third NAI, and (6) transmitting, via the first logical interface, a second registration reply message, thereby informing the WCD that the binding has been updated.

16. The home agent of claim 11, wherein the binding in the memory also contains a first care of address (COA) associated with both the HOA and the first NAI, and wherein the processor is also capable of executing program logic, stored in the memory, to perform the function of transmitting bearer traffic to the WCD via a first tunnel, wherein the first COA is an endpoint of the first tunnel.

17. A communication system comprising:
a wireless communication device (WCD);
an authentication server maintaining a profile of the WCD, wherein the profile contains a first network access identifier (NAI) and a second NAI;
a home agent communicatively coupled to the WCD and the authentication server, wherein the home agent contains a binding between a home address (HOA) and the first NAI,
wherein the WCD undergoes a handoff from a first wireless network to a second wireless network,
wherein, in response to the handoff, the WCD transmits a registration request message, containing at least the HOA and a second NAI, to the home agent, seeking to maintain a session with the home agent,
wherein the home agent, in response to receiving the registration request message, determines that the first NAI and the second NAI are different,
wherein the home agent, in response to determining that the first NAI and the second NAI are different, transmits an access request message, containing at least the HOA and the second NAI, to the authentication server,
wherein the authentication server verifies that the first NAI and the second NAI are both associated with the WCD,
wherein the authentication server transmits an access accept message to the home agent,
wherein, the home agent, in response to receiving the access accept message, updates the binding to associate the HOA with the second NAI, and
wherein the home agent transmits a registration reply message to the WCD, thereby informing the WCD that the session with the home agent is maintained.

18. The communication system of claim 17, wherein the WCD is configured to use the first NAI while on the first wireless network, and to use the second NAI while on the second wireless network.

19. The communication system of claim 17, wherein the profile also contains a third NAI that is associated with a third wireless network.

20. The communication system of claim 17, wherein the home agent contains a database of bindings, and wherein the home agent determining that the first NAI and the second NAI are different comprises:
the home agent looking up the binding, using the HOA as a key, in the database of bindings;
the home agent finding the binding in the database; and
the home agent comparing the first NAI, as it appears in the binding, to the second NAI.

* * * * *